(12) United States Patent
Glöckler

(10) Patent No.: US 8,371,979 B2
(45) Date of Patent: Feb. 12, 2013

(54) TRANSMISSION UNIT, PARTICULARLY RANGE-CHANGE TRANSMISSION

(76) Inventor: Dieter Glöckler, Ulm (DE)

( * ) Notice: Subject to any disclaimer, the term of this patent is extended or adjusted under 35 U.S.C. 154(b) by 487 days.

(21) Appl. No.: 12/595,613

(22) PCT Filed: Mar. 20, 2008

(86) PCT No.: PCT/EP2008/002285
§ 371 (c)(1),
(2), (4) Date: Oct. 12, 2009

(87) PCT Pub. No.: WO2008/125181
PCT Pub. Date: Oct. 23, 2008

(65) Prior Publication Data
US 2010/0056319 A1 Mar. 4, 2010

(30) Foreign Application Priority Data
Apr. 12, 2007 (DE) .......................... 10 2007 017 573

(51) Int. Cl.
*F16H 37/02* (2006.01)
*F16H 3/44* (2006.01)
(52) U.S. Cl. .......................... 475/211; 475/219; 475/302
(58) Field of Classification Search ................ 475/5, 72, 475/73, 80, 83, 207, 209, 210, 211, 214, 475/215, 218, 219, 302
See application file for complete search history.

(56) References Cited

U.S. PATENT DOCUMENTS

| | | | | |
|---|---|---|---|---|
| 4,976,666 A * | 12/1990 | Meyerle | ........................... | 475/83 |
| 5,114,385 A * | 5/1992 | Meyerle | ........................... | 475/79 |
| 5,961,414 A * | 10/1999 | Beim et al. | .................... | 475/212 |
| 6,080,074 A * | 6/2000 | Ulbrich et al. | ................. | 475/76 |
| 6,719,659 B2 * | 4/2004 | Geiberger et al. | ............ | 475/216 |
| 6,761,658 B1 * | 7/2004 | Stettler, Jr. | ...................... | 475/73 |
| 7,347,801 B2 | 3/2008 | Guenter et al. | | |
| 7,393,300 B2 * | 7/2008 | Miller et al. | .................. | 475/215 |
| 2002/0169048 A1 * | 11/2002 | Henzler et al. | ................ | 475/214 |

(Continued)

FOREIGN PATENT DOCUMENTS

DE 887457 7/1949
DE 3212769 A1 * 10/1983

(Continued)

*Primary Examiner* — Roger Pang
(74) *Attorney, Agent, or Firm* — Pitts & Lake, PC

(57) ABSTRACT

The invention relates to a transmission unit having a continuously variable transmission part (3) and a mechanical transmission part (4) comprising a four-shaft planetary gear (5), the part comprising a first planetary gear set (8) and a second planetary gear set (1) and being connected selectively to the output (A) via a first clutch device (K1) or a second shiftable clutch device (K2). The invention is characterized in that the first planetary gear set (8) and the second planetary gear set (10) of the planetary gear (5) each comprise a first shaft (11, 12) and a second shaft (13, 15), wherein the first shafts (11, 12) are rotationally fixed to each other and connected at least indirectly to the transmission input (E), and the second shaft of the first planetary gear set (8) is connected to the continuously variable transmission part (3) and the second shaft (15) of the second planetary gear set (9) is connected to an input part (16) of the first clutch device (K1). The first planetary gear set (8) comprises a third shaft (14) connected to the continuously variable transmission (3), wherein the third shaft (14) can be further connected to the output (A) via the second clutch device (K2).

10 Claims, 3 Drawing Sheets

U.S. PATENT DOCUMENTS

| | | |
|---|---|---|
| 2006/0128514 A1 | 6/2006 | Glockler |
| 2006/0276288 A1* | 12/2006 | Iwanaka et al. ............ 475/5 |
| 2008/0194372 A1* | 8/2008 | Glockler ............ 475/210 |
| 2010/0056318 A1* | 3/2010 | Glockler ............ 475/210 |

FOREIGN PATENT DOCUMENTS

| | | |
|---|---|---|
| DE | 4308761 | 9/1994 |
| DE | 19755612 | 6/1999 |
| DE | 10202754 | 2/2003 |
| DE | 10248400 | 4/2004 |
| DE | 102004007130 | 9/2005 |
| DE | 102004022204 | 12/2005 |
| DE | 102004022356 | 12/2005 |
| EP | 0843111 | 5/1998 |
| EP | 1061287 | 12/2000 |
| EP | 1333194 | 8/2003 |

* cited by examiner

TRANSMISSION UNIT, PARTICULARLY RANGE-CHANGE TRANSMISSION

BACKGROUND OF THE INVENTION

Transmission configurations in the form of torque split transmissions in the form of overlay transmissions are known in the number of versions.

We refer to the following representative publications:
1. EP 1 333 194
2. DE 197 55 612 A1
3. EP 1 061 287 A2
4. DE 43 08 761 A1
5. De 887 457 C
6. DE 10 2004 022 204 B3

The design according to DE 197 55 612 A1 comprises a transmission input shaft, a continuously variable speed transforming transmission connected to the transmission output shaft in the form of a traction device which comprises an input and an output, whereby the input is rotationally fixed to the transmission input shaft, a fixed gear step and an overlay transmission with a first input stage which is rotationally connected to the output of the continuously variable speed transforming transmission. Further, a second input stage is provided which optionally is connectable with the transmission input shaft to the fixed gear step using a first coupling, and an output stage which is rotationally fixed to the transmission output shaft. In this example, the fixed gear step on the transmission side is rotationally fixed with the transmission input shaft and with respect to the output side fixed gear step arranged on the first coupling in such a way that it optionally connects the second input stage of the overlay transmission on the output side with the fixed speed transforming gear. Using this solution it is possible to provide a reliable range-change transmission in a simple fashion. The solution offers the advantage of avoiding in a range-change transmission combining a continuously variable speed transforming transmission and an overlay transmission with a so-called geared-neutral range the creating of high contact speeds in the area of the first coupling because it is arranged at a position after a corresponding gearing of the high RPM of the driveshaft to the low RPM by the fixed gear step. The above reduces wear and increases the service life of the first coupling. However, there is a significant disadvantage in the direct coupling between the continuously variable transmission, also known as CVT, and the transmission input and therefore the drive shaft. The continuously variable transmission is therefore always connected to the RPM of the motor. Removing load from the overlay transmission in a range of higher RPM of the drive shaft and/or lower transmission ratios of the continuously variable transmission is achieved by providing a second coupling, which optionally connects the first input stage with the output stage of the overlay transmission. This creates a rigid connection between the output shaft of the continuously variable speed-transforming transmission and the drive shaft, by which the overlay transmission is bridged in the torque flow. Another basic problem of power transmission through the continuously variable speed-transforming transmission consists of the fact that due to its size only a maximum allowable torque can be transmitted, otherwise at very high loads impermissible slippage is observed which can lead to increased wear on the transmission. Due to the direct coupling of the continuously variable transmission to the transmission input, this transmission is always subject to the conditions provided on it. That means that the input of the CVT has the same RPM applied to it at the transmission input and therefore from the motor. Publication EP 1 333 194 reveals a transmission unit whose design is modified in such a way that the load on the traction device is significantly reduced thus insuring the transferability of high torques, in particular torques higher than could be guaranteed in the design according to DE 197 55 612 A1. In this version the transmission unit is also designed as an overlay transmission unit. This version comprises a transmission input and a transmission output, further two overlay transmissions arranged between the transmission input and the transmission output and connected. Each of the two overlay transmissions is designed as a three-shaft planetary gear. Both are connected to a four-shaft planetary gear. Further, a continuously variable transmission is connected between the first overlay transmission and the second overlay transmission in the form of a traction device. Each planetary gear comprises a sun gear, a ring gear, planetary gears and a flange. The individual shafts are formed by the sun gear, ring gear or flange of the respective overlay transmission. The transmission input is rotationally fixed with a second shaft of the first overlay transmission and a first shaft of the second overlay transmission. The transmission output is rotationally fixed with a second shaft of the first overlay transmission and a second shaft of the second overlay transmission. The coupling of the two three-shaft planetary gears to a four-shaft planetary gear is done by coupling the first and second shafts of the first and second overlay transmissions. The term shaft must be understood in functional terms, whereby it is understood to mean either the individual elements of the planetary gears—sun gear, ring gear or flange, or with elements rotationally fixed to them, for example, in the form of shafts or hollow shafts. Depending on working condition, the individual shafts assume the function of inputs or outputs. For example, for power transmission from the transmission input shaft to the transmission output shaft via the continuously variable transmission, the first overlay transmission comprises one input and two outputs. The input is formed by the first shaft, while the output which is connected at least indirectly to the continuously variable transmission is formed by the third shaft, and the second shaft is formed by the output which is rotationally fixed to the transmission output shaft. In this working condition, the second overlay transmission comprises one input and one output, whereby the input is also connected to the transmission input shaft and is formed by the first shaft of the second overlay transmission and the output of the second shaft. The third shaft is connected to the continuously variable transmission. Further, means are provided to change the transmission ratio. One of the two overlay transmissions—the first or second overlay transmissions are provided with planetary gears intermeshing in pairs between the sun gear and the ring gear. The planetary gears intermeshing in pairs are also known as double planetary gears. Due to the version of a second overlay transmission with planetary gears intermeshing in pairs designed as a planetary gear which are also known as double planetary gears, it is guaranteed for the section of the total operating range that the CVT operates with maximum RPM, whereby it is also possible to change the gear ratio of the individual discs can be done at maximum motor RPM, that means, that it is possible to turn one over zero and therefore it is also possible with the inventive transmission to change direction of rotation as well as geared-neutral. The double design offers the advantage that in an increase in RPM on the output connected to the continuously variable transmission, in particular the ring gear, this planetary gear brings about a decrease corresponding to the design of the other planetary gear on the output connected to the other planetary gear on the other planetary gear, in particular the ring gear. According to this version, it is however not possible to have the CVT work with maximum RPN a number of times over the entire operating range.

Another embodiment of the range-change transmission is known from DE 10 2004 022 204 B3. This patent comprises a simple planetary gear, three spur gears, two coupling devices and a contact transmission. The output shaft is optionally connected via both coupling devices with the sun gear or ring gear shafts.

The task of the invention is to create a range-change transmission from a continuously variable transmission, in particular in the form of a traction device and planetary gear sets which is characterized by a high overall distribution and further by a relatively simple construction and one which saves space in the axial direction. Further, a very high load relief must be calculated in the second operating range with a large amount of time which corresponds to the operating range which is outside the starting area and further to realize operating above zero so that additional means are not required to realize reverse motion.

SUMMARY OF THE INVENTION

The transmission unit, in particular the range-change transmission, comprises at least one input and at least one output, further a continuously variable transmission part provided between the input and the output and a mechanical transmission part, whereby the mechanical transmission part comprises a four-shaft planetary gear set which comprises a first planetary gear set and a second planetary gear set and which is optionally linked to the output through a first coupling device or a second shiftable coupling device. The inventive solution is further characterized in that in all operating ranges no direct coupling exists between the transmission input shaft and the continuously variable transmission, in particular the gear configuration functioning as a contact transmission at the input of the continuously variable transmission, but it is instead realized through the overlay transmission. In terms of the power flow, the continuously variable transmission is therefore arranged between the over overlay transmission and the output.

According to the invention, the first planetary gear set and the second planetary gear set of the planetary gears comprise, respectively, a first shaft and a second shaft, whereby the first shafts are rotationally fixed to each other and connected at least indirectly with the transmission input, i.e. directly or through additional transmission elements and the second shaft of the first planetary gear set with the continuously variable transmission part and the second shaft of the second planetary gear set with an input part of the first clutch device. The first planetary gear set comprises a third shaft which is connected to the continuously variable transmission, whereby the third shaft is further connectable with the output via the second clutch device. The planetary gear set therefore comprises two planetary gear sets, whereby the first of the two does not contain a sun gear. The planetary gear therefore forms a virtual modified Ravigneaux set though it does not contain a second sun gear.

The first planetary gear set is characterized by three shafts, while the second planetary gear set is characterized by two shafts, whereby the coupling between the first and the second planetary gear set occurs between a common flange. That means that the two planetary gear sets are arranged spatially adjacent in the axial direction. The first shafts of the first and the second planetary gear sets are thus rotationally fixed to each other and are further linked to the input of the transmission unit. The first shafts are formed respectively by the flange so that the planetary gears of the individual planetary gear sets are arranged on one common flange and are therefore also rotationally fixed. The first shafts are formed respectively by the flange so that the planetary gears of the individual planetary gear sets are arranged on a common flange and are therefore also locked to each other. The second shaft of the first planetary gear set and the third shaft of the first planetary gear set are connected with the continuously variable transmission part, whereby the third shaft is optionally additionally connectible with the transmission output A via the second clutch device. The coupling between the planetary gear and the continuously variable transmission is not direct, but preferably through a gear step, whereby the gear ratio can also be 1:1. The second planetary gear set of the planetary gear, in particular the second shaft, is optionally connectible with the output via the first clutch device. Each of the clutch devices comprises a first clutch part which is connected to the corresponding shafts of the planetary gear and an output part, which is locked to the output. Both clutch devices can also be combined into a double clutch device.

The inventive solution permits a transmission design which is characterized by a compact axial length, which is obtained in particular due to the modification of the Ravigneaux set. Further, the described gear configuration can be used to realize a geared-neutral, whereby a separate configuration to realize a reverse gear can be dispensed with in a particularly advantageous fashion.

Preferably, the continuously variable transmission is a traction device. This can be a friction-locked or non-slip traction device. In the simplest case, it will comprise two disc arrangements which run around a traction device which operates by adhesion. Other versions are possible. It is also conceivable instead of a traction device to use a mechanical continuously variable transmission in the form of a toroid transmission or also an electrical transmission consisting for example of two electrical machines which can be operated as generator and/or motor which are connected via an intermediate circuit.

To control the transferable power share using the continuously variable transmission and/or to convert RPM/torque, appropriate means are assigned to the continuously variable transmission. Depending on the design of the continuously variable transmission this can be done mechanically, hydraulically, or electro-pneumatically. Other possibilities are also conceivable. In designing the traction device, means are provided to adjust the disc distance and/or the running radius for the individual disc arrangements.

The transmission input can be coaxial or concentric to the individual elements, the continuously variable transmission, mechanical transmission part. Further, coaxiality or eccentricity can exist between the input and the output. This depends in the individual case on the concrete design and configuration of the transmission.

The inventive transmission is characterized by two operating ranges optionally shiftable by the two clutch devices, whereby as a rule shifting can be done alternately, although to avoid an interruption of tractive force which can occur during synchronicity, a first operating range, which is assigned to the first clutch device and marks the starting area, and a second operating range used outside the starting area are used. Using the inventive version it is possible to achieve a very high overall spread on the other hand and further to achieve in both travelling areas and/or operating ranges a relief of the continuously variable transmission. RPM and torque are infinitely variable in each of the individual operating ranges.

The inventive solution can be used both for motor vehicles and for stationary applications such as in wind power systems, etc.

DESCRIPTION OF THE PREFERRED EMBODIMENT

The inventive solution is described below using a figure. It depicts a particularly advantageous embodiment of the inventive solution. The inventive solution is however not limited to the embodiment shown in FIG. 1. Other modification of the transmission configuration are possible.

Figure 1:
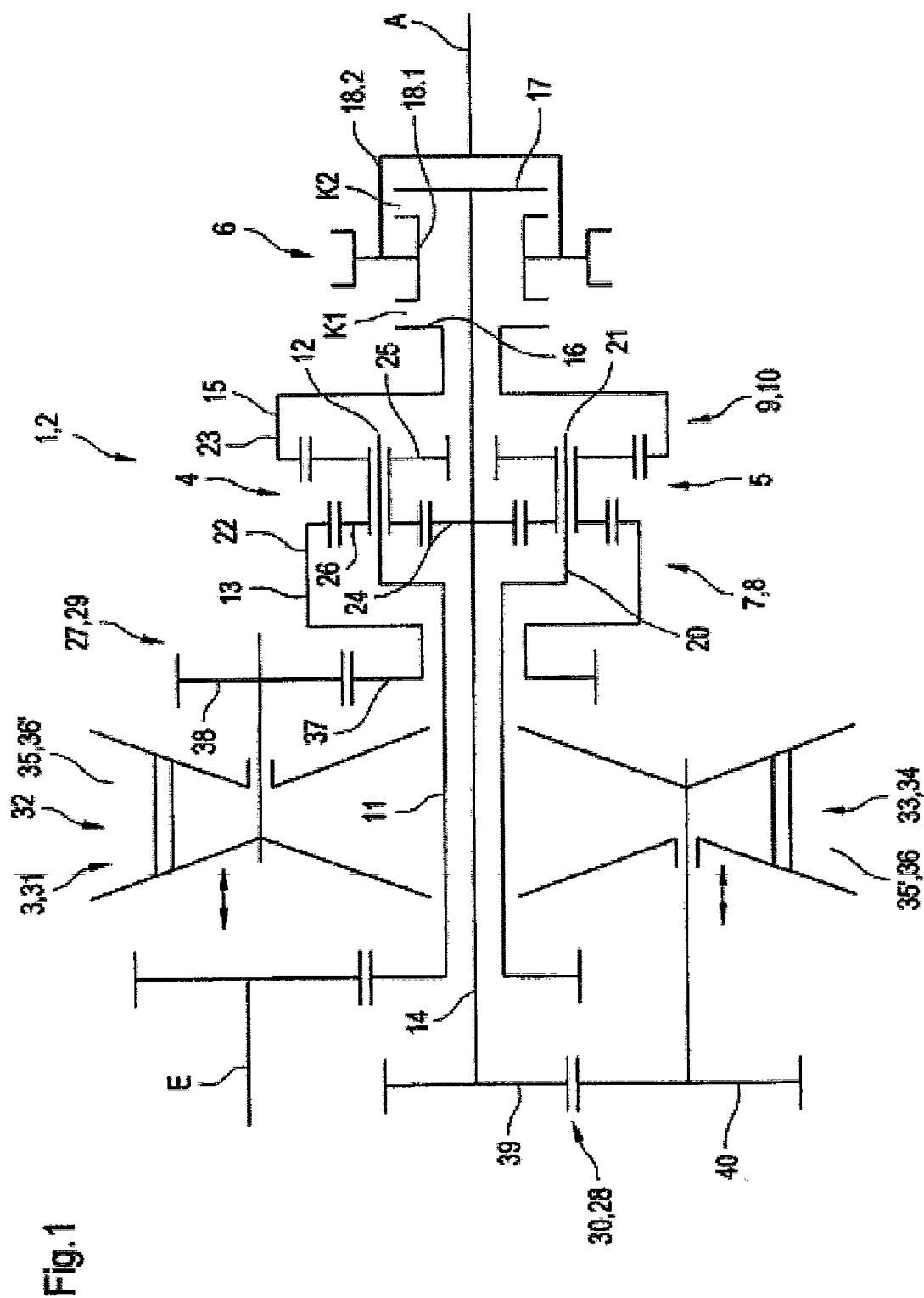
FIG. 1 illustrates the transmission with a belt transmission.
Figure 2:
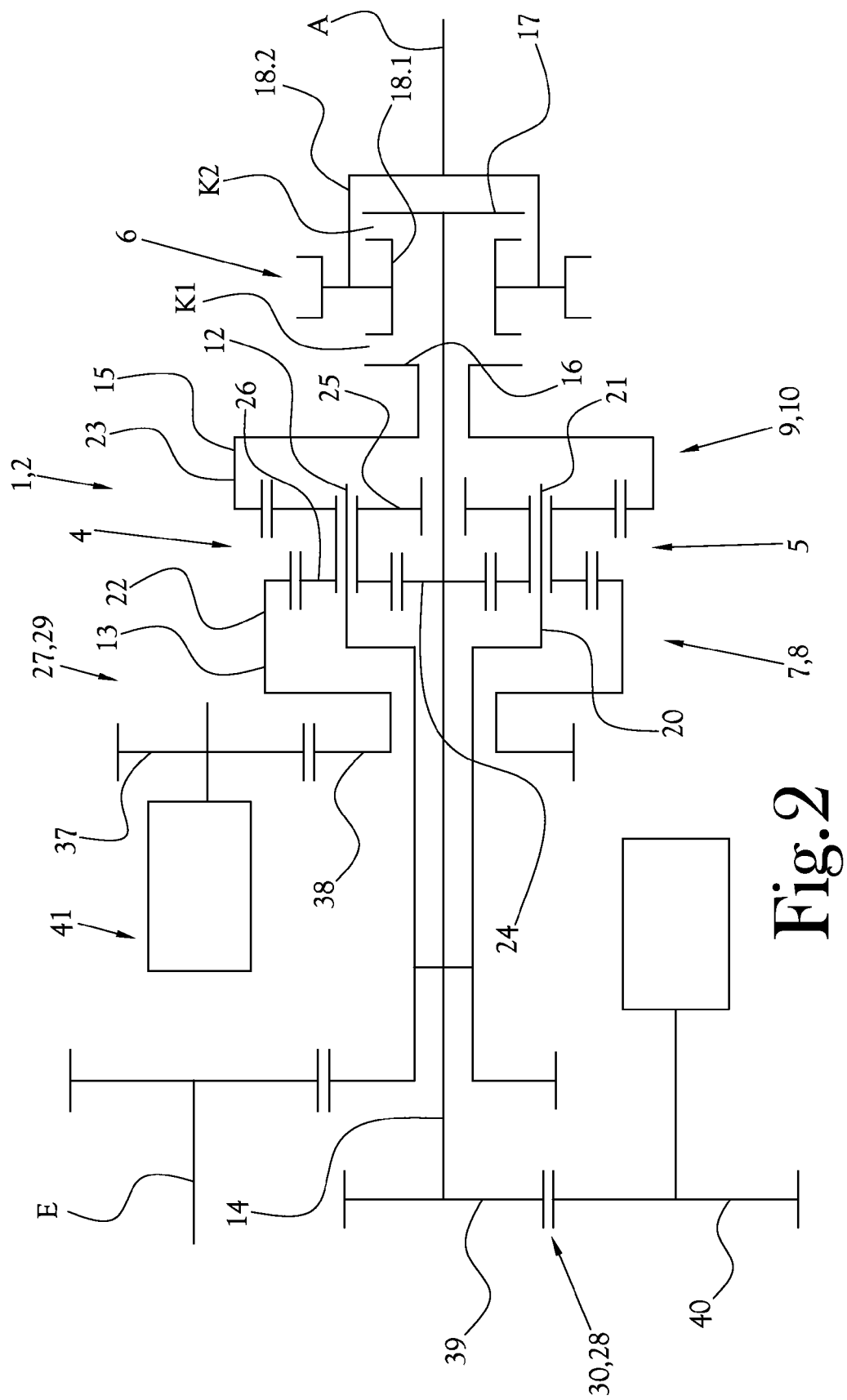
FIG. 2 illustrates the transmission with an electric variable transmission.
Figure 3:
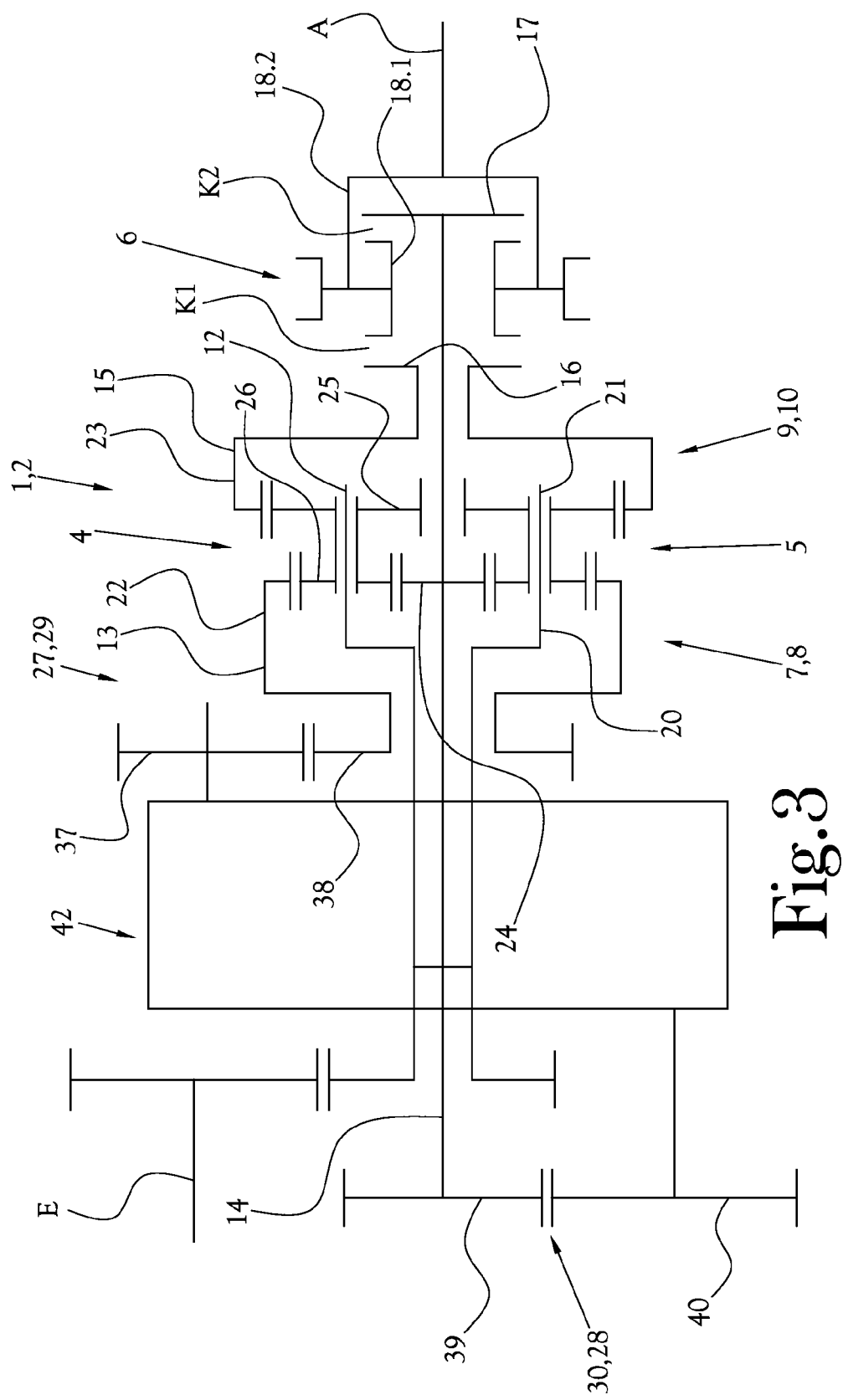
FIG. 3 illustrates the transmission with a toroidal transmission.

FIG. 1 illustrates in a simplified schematic fashion the basic structure of a transmission unit 1 according to the invention, in particular in the form of a range-change transmission 2. This transmission comprises at least an input E and an output A, a continuously variable transmission part 3 and a mechanical transmission part 4. The mechanical transmission part 4 comprises a planetary gear 5. The planetary gear 5 is designed as a four-shaft planetary gear set, whereby the basic structure corresponds to a modified Ravigneaux set, though it does not contain a second sun gear, and whereby one of the shafts is connected to the continuously variable transmission part 3 and at the same time can be connected to the output A. The four-shaft planetary gear 5 is optionally connectable to the output A via two clutch devices in the form of shiftable clutches K1 and K2. The coupling with the output A is done via the coupling of the different shafts of the planetary gear 5 through the clutch devices K1 and/or K2. The individual clutch devices K1 and K2 are provided with an input part 16 and/or 17, which when the clutch devices K1 and/or K2 are actuated can be connected with a second output part 18.1, 18.2 locked to the output A. Further, the planetary gear 5 is connected to the input E or connectable in corresponding applications depending on [its] design. The continuously variable transmission part 3 is linked with a clutch part of the second clutch device K2 through the planetary gear 5. The continuously variable transmission part 3 is therefore placed between the planetary gear 5 and the output A. As previously stated, the planetary gear 5 is a realization of a four-shaft planetary gear in the form of a modified Ravigneaux set, though without a second sun gear. The planetary gear 5 comprises a three-shaft planetary gear 7 in the form of a first planetary gear set 8 and a two-shaft planetary gear 9 in the form of a second planetary gear set 10. A first shaft 11 of the first planetary gear set 8 and a first shaft 12 of the second planetary gear set 10 are locked to each other and with the input E. The first shaft 11 of the first planetary gear set 8 and the first shaft 12 of the second planetary gear set 10 of the mechanical transmission part 4, in particular of the planetary gear 5 are locked to each other. A second shaft 13 is connected with the continuously variable gear part 3, in particular through a connecting drive 27, while a third shaft 14 of the first planetary gear set 8 is connected to the continuously variable gear part 3, in particular through connecting drive 28, and is further locked to an input part 17 of the second clutch device K2. A second shaft 15 of the second planetary gear set 10 is connectible with the output A at least indirectly, in particular through clutch device K1. The second shaft 15 is locked to an input part 16 of the first clutch device K1.

The first shaft 11 of the first planetary gear 8 of the four-shaft planetary gear 5 in the mechanical transmission part 4 is formed by the flange 20. Further, the first shaft 12 of the second planetary gear set 10 of the four-shaft planetary gear 5 is also formed by the flange 21. The flange 20 and the flange 21 are locked to each other or form an integral unit. The coupling between the two planetary gear sets 8 and 10 is formed by the flanges 20, 21. The planetary gears 25 and 26 of the individual planetary gear sets 8, 10 are locked to each other. The second shaft 13 of the first planetary gear set is formed by a ring gear 22, while the second shaft 15 of the second planetary gear set is formed by a ring gear 23. The third shaft 14 of the first planetary gear set 8 is formed by a sun gear 24. The second planetary gear set 10 does not comprise such a third shaft. That means that the planetary gears 25 of the second planetary gear set 10 only mesh with the ring gear 23, while the planetary gears 26 of the first planetary gear set 8 run between sun gear 24 and ring gear 22. In this case, the coupling with the continuously variable gear part 3 is not directly through coupling the shafts, in particular the second shaft 13 and the third shaft 14 with the continuously variable gear part 3, but instead through the connecting drives 27 and 28, which in the simple case merely comprise a transmission step 29 and/or 30 between the respective shafts 13 and 14 and the continuously variable gear part 3. In the described case, the continuously variable gear part 3 is designed as the contact transmission 31 and comprises a first disc configuration 32 and a second disc configuration 33 which are connected via a traction mechanism 34, whereby depending on the disc position RPM and torque can be changed using the belt and chain drive. The individual disc arrangements 32 and 33 function according to configuration and use because they their mutual distance can be adjusted as input 35 and as output 36 of the continuously variable gear part 3. Depending on the power transmission direction in the transmission unit 1 and the transmission through the continuously variable gear part 3, the transmission direction is changed or the direction of rotation on the output A of the transmission unit.

In the simplest case, the transmission step 29 comprises two intermeshing spur gears 37 and 38, whereby the spur gear 37 is co-formed with the ring gear 22 of the first planetary gear set 8, and/or forms a unit with it. The transmission step 30 also preferably comprises respectively two spur gears 39 and 40, whereby the spur gear 39 is locked to the third shaft 14 in the form of the sun gear 24 of the first planetary gear set 8. The spur gear 40 is locked to the second disc configuration 33. For the transmission step 29, the spur gear 38 is locked to the first disc configuration 32. The transmission steps 29 and 30 can also be designed differently. In the simplest case, they comprise at least two intermeshed spur gears, though another number is equally conceivable, whereby both transmission steps should be characterized by a same transmission direction.

The input E of the transmission unit 1 is arranged eccentrically to the rotational axis of the mechanical transmission part 4 and the continuously variable gear part 3, and is therefore eccentric with respect to the output A.

The transmission unit 1 can be operated in two operating ranges, whereby a first operating range is characterized by the actuation of the clutch device K1. In this case, the CVT's full transmission range is used. In the second operating range, the second clutch device K2 is engaged and the first clutch device released. In this case, the clutching of the planetary gear set 8 to the output A occurs using the clutch device K2. Within the operating ranges it is possible to adjust the continuously variable transmission part respectively over the entire adjustment range in both directions. This means for the contact transmission 31 that both the first disc configuration 32 and the second disc configuration 33 can travel in both directions to their maximum positions. That means that geared-neutral operation is possible with the inventive solution. It also means that a separate reverse gear is not necessary because it is possible to reverse the direction of rotation as part of adjustment range of the continuously variable transmission in conjunction with the planetary gear 5.

In order to do so, in the first operating range the first disc 32 is adjusted from slow, that is a large contact angle, towards the direction of "fast," that is, a small contact angle. The design of the overall transmission is done in such a way that a part of the adjustment range, that is, about 75 percent, from "fast" to "slow" of the first disc configuration 32 is achieved or the geared-neutral range, that is, the transmission is virtually stationary at output A and when a further adjustment is made in the direction of an even larger contact range, the result is a reversal of the direction of rotation at output A of the transmission unit. That means that there is a point in the adjustment range at which an above zero rotation is reached. In the first operating range that means the first clutch device K1 is engaged and the second clutch device K2 is open. Power is transmitted from input E to output A through the first planetary gear set 8 to the continuously variable gear part 3 and by again back-coupling to the second planetary gear set 10 on the output A. That means that the drive occurs primarily via the input E to the first shaft 11, from the sun gear 24 to the second disc configuration 33, which transmits the power via the traction mechanism 34 on the disc configuration 32, whereby the disc configuration 32 acts as output of the continuously variable transmission unit. The second planetary gear set 10 is driven via the back-coupling through the planetary gears of the second planetary gear set 10, and with it also the output A through the clutching device K1. The RPM at the output A varies depending on the setting of the continuously variable transmission. If the setting range of the first disc configuration 32 is exhausted to the point that it is in a position in which the running radius for the traction mechanism is on the smallest possible running radius, that means that between the disc configuration 33 to the disc configuration 32 there is a gearing to slow or vice-versa from 32 to 33 a gearing to fast, all shafts will run synchronously on the four-shaft planetary gear 5. In this case, the clutch K2 can be engaged and the coupling K1 opened. This may involve a partial overlapping of the engagement of the clutch devices K1 and K2 and this is also advantageous because it does not result in an interruption in torque. However, it is also conceivable with complete synchronicity to use synchronously engageable clutches.

If the clutch device K2 is closed, the setting range of the second disc configuration 33 is selected in such a way that it is on a larger running radius than that of the first disc configuration 32, there will be a setting on the second disc configuration 33 again in the direction of a smaller running radius, that means that it moves faster, while the setting on the first disc configuration 32 occurs in the direction of a larger running radius, that is, it revolves more slowly.

Advantageously, the following gearings are selected for the design of the planetary gear sets. The first planetary gear set 8 is characterized by a standard gearing of 1:2, that is, the sun gear 24 is twice as small as the ring gear 22. Also, the following gearing ranges are conceivable, whereby the list is not complete: 1:1.62 through 1:2.5.

The transmission unit depicted in FIG. 1 represents a particularly advantageous embodiment with a small number of clutch elements; in this case only clutch elements K1 and K2, further the number of components is also limited to a minimum. With this embodiment it is possible to achieve a particularly high spread in the first operating range. The clutch devices K1 and K2 can also be subsumed in a double clutch configuration 6.

REFERENCE LIST

1 Transmission unit
2 Range-change transmission
3 Continuously variable transmission part
4 Mechanical transmission part
5 Four-shaft planetary gear
6 Double clutch
7 Three-shaft planetary gear
8 First planetary gear set
9 Two-shaft planetary gear
10 Second planetary gear set
11 First shaft
12 First shaft
13 Second shaft
14 Third shaft
15 Second shaft of planetary gear set 10
16 Input part
17 Input part
18.1, 18.2 Output part
20 Flange
21 Flange
22 Ring gear
23 Ring gear
24 Sun wheel
25 Planetary gear
26 Planetary gear
27 Connecting drive
28 Connecting drive
29 Transmission step
30 Transmission step
31 Contact transmission
32 First disc configuration
33 Second disc configuration
34 Traction mechanism
35 Input
36 Output
37 Spur gear
38 Spur gear
39 Spur gear
40 Spur gear
E Input
A Output
K1 First clutch device
K2 Second clutch device

The invention claimed is:

1. A range-changing transmission unit, comprising an input and an output, with a continuously variable transmission part and a mechanical transmission part, wherein the mechanical transmission part comprises a four-shaft planetary gear having a first planetary gear set and a second planetary gear set, each of the first and second planetary gear sets has a plurality of planetary gears, wherein one of said first and second planetary gear sets does not contain a sun gear, the four-shaft planetary gear is selectively connected to the output through one of a first clutch device and a second clutch device, wherein the continuously variable transmission part is connected between the mechanical transmission part and the output through an input part of the second clutch device, wherein the first planetary gear set and the second planetary gear set of the planetary gear each comprise a first shaft and a second shaft, wherein the first shafts of the first planetary gear set and the second planetary gear set are formed by a flange of the planetary gear sets and the planetary gears of each planetary gear set are connected in a rotationally fixed manner, wherein the first shafts are rotationally fixed to each other and connected at least indirectly to the transmission input, the second shaft of the first planetary gear set is connected to the continuously variable transmission part, the second shaft of the second planetary gear set is connected to an input part of the first clutch device, and the first planetary gear set comprises a third shaft which is connected to the continuously variable transmission part, wherein the third shaft is selectively connected to the output via the second clutch device.

2. The transmission unit according to claim 1 wherein the second planetary gear set of the planetary gear can be connected to the output via the first clutch device.

3. The transmission unit according to claim 1 wherein the second shaft and the third shaft of the first planetary gear set are each connected to the continuously variable transmission via a gear step.

4. The transmission unit according to claim 1 wherein the second shaft of the first planetary gear set is formed by the ring gear and the third shaft of the first planetary gear set is formed by the sun wheel.

5. The transmission unit according to claim 1 wherein each clutch device is provided with an output part to which the output is connected in a rotationally fixed fashion.

6. The transmission unit according to claim 1 wherein the continuously variable transmission takes the form of a traction device.

7. The transmission unit according to claim 6 wherein the traction device is a friction-locked or non-slip traction device.

8. The transmission unit according to claim 6 wherein the continuously variable transmission is designed as a mechanical toroidal transmission.

9. The transmission unit according to claim 1 wherein the continuously variable transmission is designed as an electrical transmission.

10. The transmission unit according to claim 1 wherein the continuously variable transmission is not directly linked to the input.

* * * * *